(12) United States Patent
Lin

(10) Patent No.: US 11,413,576 B2
(45) Date of Patent: Aug. 16, 2022

(54) METHOD FOR TREATING GAS

(71) Applicant: Cheng-Jen Lin, New Taipei (TW)

(72) Inventor: Cheng-Jen Lin, New Taipei (TW)

( * ) Notice: Subject to any disclaimer, the term of this patent is extended or adjusted under 35 U.S.C. 154(b) by 485 days.

(21) Appl. No.: 16/601,617

(22) Filed: Oct. 15, 2019

(65) Prior Publication Data

US 2020/0391157 A1 Dec. 17, 2020

(30) Foreign Application Priority Data

Jun. 12, 2019 (TW) .................................. 108120319

(51) Int. Cl.
| | |
|---|---|
| *B01D 47/00* | (2006.01) |
| *B01D 53/62* | (2006.01) |
| *B01D 53/78* | (2006.01) |
| *C01D 7/00* | (2006.01) |
| *A23K 10/10* | (2016.01) |

(52) U.S. Cl.
CPC ............ *B01D 53/78* (2013.01); *B01D 47/00* (2013.01); *B01D 53/62* (2013.01); *C01D 7/00* (2013.01); *A23K 10/10* (2016.05); *B01D 2251/304* (2013.01); *B01D 2251/604* (2013.01); *B01D 2257/504* (2013.01); *B01D 2258/025* (2013.01)

(58) Field of Classification Search
CPC .. B01D 2258/025; B01D 53/62; B01D 47/00; B01D 2257/504; B01D 2251/604; B01D 53/73; B01D 2258/0283; B01D 2251/304; B01D 53/78; C01D 7/00; C01D 7/07; A23K 10/10; Y02C 20/40; Y02P 20/151
See application file for complete search history.

(56) References Cited

U.S. PATENT DOCUMENTS

| | | | |
|---|---|---|---|
| 8,650,798 B1* | 2/2014 | Armstrong | A01H 13/00 47/1.4 |
| 2012/0121489 A1 | 5/2012 | Chew | |
| 2015/0173317 A1* | 6/2015 | Ordway | A01G 33/00 435/286.5 |
| 2017/0007960 A1 | 1/2017 | Kimura | |
| 2021/0340033 A1* | 11/2021 | Johnson | B01D 61/422 |

FOREIGN PATENT DOCUMENTS

| | | | | |
|---|---|---|---|---|
| CN | 201744301 U | | 2/2011 | |
| CN | 102489125 A | | 6/2012 | |
| CN | 106902628 A | | 6/2017 | |
| CN | 109 554 299 A | * | 4/2019 | ............... C12N 1/20 |
| EP | 2 208 521 A2 | * | 7/2010 | ............ B01D 53/34 |
| EP | 3453445 A1 | | 3/2019 | |
| TW | 201801786 A | | 1/2018 | |
| TW | 2020 045 240 A | * | 12/2020 | ............ A23K 10/10 |
| WO | WO 2018 182 100 A1 | * | 10/2018 | ............... C12N 1/20 |

* cited by examiner

*Primary Examiner* — Timothy C Vanoy
(74) *Attorney, Agent, or Firm* — WPAT, PC

(57) ABSTRACT

The present invention provides a method for treating a gas, comprising: step (A): collecting a gas comprising carbon dioxide and fine particulate matter; step (B): rinsing the gas with water to obtain a rinsed gas; and step (C): contacting the rinsed gas with a basic solution in a way of co-current flow to absorb the carbon dioxide in the rinsed gas by the basic solution to obtain a treated gas and a weak basic solution; wherein the pH value of the basic solution is between 9 and 14, and the pH value of the weak basic solution is between 8 and 8.5. The method can reduce the content of both fine particulate matter and carbon dioxide.

9 Claims, No Drawings

METHOD FOR TREATING GAS

CROSS-REFERENCE TO RELATED APPLICATIONS

This application is based upon and claims priority under 35 U.S.C. 119 from Taiwan Patent Application No. 108120319 filed on Jun. 12, 2019, which is hereby specifically incorporated herein by this reference thereto.

BACKGROUND OF THE INVENTION

1. Field of the Invention

The present invention relates to a method for treating a gas, and particularly to a method of purification treatment for reducing the carbon dioxide and fine particulate matter.

2. Description of the Prior Arts

With the industrial development, the waste gas, emitted from boilers of factories and thermal power plants, etc., increases greatly, which causes severe air pollution. Among others, the emitted waste gas makes the amount of greenhouse gas increase and strengthens the greenhouse effect, which results in global warming. Thus, the extreme climate increases, floods and droughts frequently happen, and extremely cold and hot climates normalize. These impact the crop harvest and make the ice field melt and sea level rise, which seriously affects the ecology and the environment. Consequently, the reduction of carbon dioxide, the main greenhouse gas, is the goal of the global effort.

Additionally, the particulate matter in the emitted gas, produced by burning, even directly affect the human health, especially the particulate matter 2.5 and particulate matter 1.0. Due to the fact that the particle diameters thereof are less than or equal to 2.5 micrometers or even less than or equal to 1.0 micrometer, said particulate matter can penetrate the alveolus of lungs and arrive at the Bronchial wall, which influences the gas exchange of alveolus of lungs. Long-term exposure to fine particulate matter not only causes respiratory disease but also increases the risk of lung cancer. Therefore, there is an urgent need for a method for improving air quality.

SUMMARY OF THE INVENTION

For the reason that the air quality cannot be effectively improved in the prior art, the object of the present invention is to reduce both the content of carbon dioxide and the fine particulate matter in the gas in order to achieve the effect of reducing air pollution.

To achieve the above purpose, the present invention provides a method for treating a gas, comprising:

step (A): collecting a gas comprising carbon dioxide and fine particulate matter;

step (B): rinsing the gas with water to obtain a rinsed gas; and step (C): contacting the rinsed gas with a basic solution in a way of co-current flow to absorb the carbon dioxide in the rinsed gas by the basic solution to obtain a treated gas and a weak basic solution; wherein the pH value of the basic solution is between 9 and 14, and the pH value of the weak basic solution is between 8 and 8.5.

According to the present invention, by rinsing the gas comprising carbon dioxide and fine particulate matter with water firstly can absorb part of the carbon dioxide in the gas and, in the meantime, deposit the fine particulate matter in the gas. Therefore, not only the content of the fine particulate matter in the rinsed gas is reduced, but also the adhesion of the fine particulate matter on the tunnel of gas transportation is avoided. Next, by contacting the rinsed gas with the basic solution in the way of co-current flow can extend the contacting time of the basic solution with the carbon dioxide in the rinsed gas and increase the reaction chance of acid-base neutralization, since the flow directions of the basic solution and the rinsed air are the same. Consequently, the carbon dioxide in the gas can be absorbed more completely and the effect of reducing both the content of carbon dioxide and fine particulate matter in the gas can be achieved.

Preferably, in some embodiments of the present invention, the sources of the gas comprising carbon dioxide and fine particulate matter are, but not restricted to, the waste gas produced from burning coal, natural gas, or fuel oil by thermal power plants, steel mills, concrete plants, petrochemical plants, oil refineries, paper mills, and heating plants, etc.

Preferably, in said step (B), the temperature of said water is below 100° C., so that the temperature of said gas can be reduced. More preferably, the temperature of said water is between 50° C. and 60° C.

Preferably, said step (C) is conducted at the temperature below 90° C., which can prevent the water content, comprised in the basic solution, from evaporating due to the excessively high temperature, and makes the dissolved basic compound deposit partly, resulting in a stuck tunnel for basic solution transportation easily. More preferably, the step (C) is conducted at the temperature between 4° C. and 90° C., since the reaction rate of acid-base neutralization decreases at the temperature below 4° C. Additionally, considering the solubility of the salt, obtained by the reaction of said basic solution and carbon dioxide, more preferably, step (C) is conducted between 50° C. and 60° C.

Preferably, said basic solution is a sodium hydroxide solution. The product, sodium hydrogen carbonate, obtained by the reaction of sodium hydroxide with carbon dioxide not only causes no environmental pollution, but also can be collected for the further utilization. Especially, it can be a good carbon source in a microalgae culture tank in the following step (D).

Preferably, said method further comprises step (D): adding the weak basic solution to the microalgae culture tank containing microalgae to provide the carbon source for the photosynthesis of microalgae, so that the microalgae can be further processed to produce functional products, animal feeds and biodiesel.

Preferably, said method further comprises step (E): evaporating the water content in the weak basic solution to obtain a solid sodium hydrogen carbonate. The obtained solid sodium hydrogen carbonate can be further provided for industrial use in order to increase the economic benefits of the present invention.

Preferably, said step (C) includes:

step (C1): preliminarily contacting the rinsed gas with the basic solution in the way of co-current flow, to absorb the carbon dioxide in the rinsed gas by the basic solution to obtain a preliminary treated gas and a first weak basic solution; and step (C2): again contacting the preliminary treated gas with the basic solution in the way of co-current flow to absorb the carbon dioxide in the preliminary treated gas by the basic solution to obtain the treated gas and a second weak basic solution, wherein the weak basic solution comprises the first weak basic solution and the second basic weak solution. More preferably, step (C2) can be repeated more than once. For example, when step (C2) is repeated for once, it means the rinsed gas is contacted with the fresh basic solution three times sequentially in step (C).

Preferably, in said step (C), the total contacting time of the basic solution with the rinsed gas is more than 5 seconds. More preferably, the total contacting time is more than 15 seconds. More preferably, the total contacting time is more than 1 minute.

More preferably, in said step (C), the flow rate of the basic solution is 500 Liter (L)/hour.

In said step (C), the higher the concentration of the basic solution, the easier the basic compound in the basic solution would deposit, which results in a stuck tunnel and increases the risk for the operation. However, the lower the concentration of the basic solution, the higher the needed flow rate of the basic solution. In other words, it is relatively energy-wasting. Therefore, preferably, the concentration of the basic solution is between 1 wt % to 2 wt %.

In some embodiments, in said step (C), the basic solution contacts the rinsed gas, in the form of a water column or water drops having the diameter of 1 mm, in a way of co-current flow. The ratio of the flow rate of the basic solution to the flow rate of the gas being too high reduces the contacting area between the basic solution and the rinsed gas, which increases the consumed energy. However, when the flow rate ratio is too low, the basic solution atomizers and drifts, resulting in the decreased efficiency of the carbon dioxide solubility. Therefore, preferably, the flow rate ratio of the basic solution to the rinsed gas is between 1:200 and 1:800; more preferably, between 1:400 and 1:700.

Preferably, said microalgae is *Botryococcus braunii, Chlorella* sp., *Crypthecodinium cohnii, Cylindrotheca* sp., *Dunaliella primolecta, Isochrysis* sp., *Monalanthus Salina, Nannochloris* sp., *Nannochloropsis* sp., *Neochloris oleoabundans, Nitzschia* sp., *Phaeodactylum tricornutum, Schizochytrium* sp., *Tetraselmis suecica, Arthrospira maxima, Arthrospira platensis*, or any combination thereof. More preferably, said microalgae is *Chlorella* sp., *Dunaliella primolecta, Isochrysis* sp., *Nannochloris* sp., *Neochloris oleoabundans, Schizochytrium* sp., *Spirulina*, or any combination thereof, cultured by the seawater.

The advantage of the present invention is to achieve, by rinsing with water firstly, both the deposition of the fine particulate matter in the gas comprising carbon dioxide and fine particulate matter, and the absorption of part of the carbon dioxide in said air. Furthermore, contacting the rinsed gas with the basic solution in a co-current way increases the interaction time between the basic solution and the carbon dioxide, which results in the complete interaction of acid-base neutralization. Therefore, the present invention achieves the effects of dramatically reducing both the fine particulate matter and carbon dioxide in the gas, which decreases the emission of greenhouse gas and clarifies the air quality, and further improves the ecology and environment.

Additionally, according to the present invention, the weak basic solution, obtained after treating the gas, can be either used in the processing of cultured microalgae for the animal feeds, functional products and the biodiesel or be used to produce solid sodium hydrogen carbonate for industrial use. Besides, the solution of microalgae cultivation can be recycled to use in the carbon dioxide absorption, so that the products of the present invention can be used effectively.

DETAILED DESCRIPTION OF THE PREFERRED EMBODIMENTS

First, in step (A), a gas comprising carbon dioxide and fine particulate matter was collected. Said gas was an emitted waste gas collected from the high-temperature boilers of steelmaking, and comprised average 159 $g/m^3$ carbon dioxide and average 35.42 $mg/m^3$ fine particulate matter, PM 2.5. Besides, the temperature of said gas was higher than 400° C.

Next, in step (B), the gas was rinsed with water to obtain a rinsed gas. This makes the PM2.5 in said gas deposit and, in the meantime, makes the partial carbon dioxide dissolve in the water. The collected gas, with an average carbon dioxide concentration of 52.5 kg/hr detected by a carbon dioxide monitor (New Guardian®, Edinburgh Sensor), with a flow rate of 330 $m^3$/hr, was rinsed by the water, below 50° C., with a flow rate between 2 $m^3$/hr and 3 $m^3$/hr for 5 seconds, which makes the temperature of said gas decrease to lower than 50° C.

Then, through step (C1): the rinsed gas, having a flow rate of 330 $m^3$/hr, was preliminarily contacted with a 2 wt % sodium hydroxide solution, having a flow rate of 500 L/hr, in the way of co-current flow. The preliminary contact was a circulation spray lasting for five seconds. In the meantime, the flow rate ratio of the basic solution to the gas was 1:600. Said circulation spray refers to the rinsed gas sprayed by a circulated sodium hydroxide solution in a chamber, so that the carbon dioxide in the rinsed gas was absorbed by the sodium hydroxide solution, to obtain a preliminary treated gas and a first sodium hydrogen carbonate solution; and step (C2): the preliminary treated gas, having a flow rate of 330 $m^3$/hr, was "again contacted" with the 2 wt % sodium hydroxide solution, having a flow rate of 500 L/hr, in the way of co-current flow. Besides, the term "again contacting" refers to a circulation spray lasting for 5 seconds, resulting in a second sodium hydrogen carbonate solution and an again treated gas. After that, step (C2) was repeated once, in order to obtain the third sodium hydrogen carbonate solution and a treated gas. The first sodium hydrogen carbonate solution, second sodium hydrogen carbonate solution and third sodium hydrogen carbonate solution, obtained from the three stages of contacting, were collected together into a storage pool. Therefore, in step (C), the rinsed gas was separately contacted with 2 wt % sodium hydroxide solution for three times sequentially, so that the carbon dioxide in the gas was mostly absorbed by the sodium hydroxide solution. Finally, a treated gas was obtained. The content of carbon dioxide and the fine particulate matter of said treated gas was largely reduced compared to the original waste gas.

In step (C), when the sodium hydroxide solution contacted the carbon dioxide, the acid-base neutralization reacted immediately. Besides, by contacting the rinsed gas with the basic solution in the way of co-current flow, the contacting time of the sodium hydroxide solution with the carbon dioxide was extended. Therefore, the acid-base neutralization can fully react.

It can be found from the detecting results of the treated gas, that the carbon dioxide was reduced for more than 45 kg/hr in total compared to the original collected gas in the step (A), having 52.5 kg/hr carbon dioxide and a flow rate of 330 m3/hr, according to the carbon dioxide monitor (New Guardian®, Edinburgh Sensor). Among others, the averages of removing efficiency of the carbon dioxide and PM 2.5, which were detected 5, 10, 20, 25, 30 minutes after the treatment of the present embodiment, are shown in the following table 1.

TABLE 1

The removing efficiency of carbon dioxide and PM 2.5

| Time (minute) | Concentration detected at the inlet | | Concentration detected at the outlet | | flow rate ($m^3/hr$) | Average removing efficiency of carbon dioxide | Average removing efficiency of PM2.5 |
| --- | --- | --- | --- | --- | --- | --- | --- |
| | carbon dioxide concentration ($g/m^3$) | PM2.5 Concentration ($mg/m^3$) | carbon dioxide concentration ($g/m^3$) | PM2.5 concentration ($mg/m^3$) | | | |
| 5 | 152.09 | 34 | 23.89 | 1.3 | 330 | 86.93% | 96.28% |
| 10 | 157.14 | 34.5 | 19.28 | 1.3 | 330 | | |
| 15 | 160.51 | 37.5 | 19.26 | 1.3 | 330 | | |
| 20 | 161.63 | 35.5 | 20.57 | 1.3 | 330 | | |
| 25 | 159.95 | 36 | 20.64 | 1.4 | 330 | | |
| 30 | 162.76 | 35 | 21.07 | 1.3 | 330 | | |
| Average | 159.01 | 35.42 | 20.79 | 1.32 | 330 | | |

According to the results of the table 1, the removing efficiency of PM 2.5 of every 5 minutes of the present invention can reach 95%, and that of carbon dioxide can almost reach 90%.

Then the sodium hydrogen carbonate solution obtained in step (C) was further processed through step (D): adding the sodium hydrogen carbonate solution to the microalgae culture tank comprising microalgae. The partial sodium hydrogen carbonate solution obtained from said step (C) was added into the culture tank containing microalgae in order to provide the carbon source for the photosynthesis of the microalgae. The growing microalgae was processed to produce the functional products, animal feeds, or biodiesel. Among others, the microalgae can be *Botryococcus braunii, Chlorella* sp., *Crypthecodinium cohnii, Cylindrotheca* sp., *Dunaliella primolecta, Isochrysis* sp., *Monalanthus Salina, Nannochloris* sp., *Nannochloropsis* sp., *Neochloris oleoabundans, Nitzschia* sp., *Phaeodactylum tricornutum, Schizochytrium* sp., *Tetraselmis suecica, Arthrospira maxima*, or *Arthrospira platensis*. The carbon dioxide was consumed after the photosynthesis of the microalgae in the culture tank, so that the hydroxide ion was released from the sodium hydrogen carbonate solution. Therefore, the aqueous solution, in the culture tank, can be concentrated after collecting microalgae, and the pH value can be adjusted by adding partial solid sodium hydroxide to the concentrated aqueous solution from the culture tank in order to be used as a basic solution in step (C), and thus achieves the effect of the circulation utilization. The method of said concentration may utilize solar exposure or the remaining heat on the chimney for emitting waste gas, generated by burning or burning oil, to evaporate the water content, or may utilize the molecular sieve to remove the water content.

Besides, the partial sodium hydrogen carbonate solution obtained in step (C) was further processed through step (E): evaporating the water content in the sodium hydrogen carbonate to obtain solid sodium hydrogen carbonate.

The above embodiments are only preferred embodiments of the present invention, not intended to limit the present invention in any aspect. The scope of the right asserted from the present invention shall be based on the claims.

What is claimed is:

1. A method for treating a gas comprising:
   step (A): collecting a gas comprising carbon dioxide and fine particulate matter;
   step (B): rinsing the gas with water to obtain a rinsed gas; and
   step (C): contacting the rinsed gas with a basic solution in a way of co-current flow to absorb the carbon dioxide in the rinsed gas by the basic solution to obtain a treated gas and a weak basic solution; wherein the pH value of the basic solution is between 9 and 14, and the pH value of the weak basic solution is between 8 and 8.5, wherein step (C) includes:
   step (C1): preliminarily contacting the rinsed gas with the basic solution in the way of co-current flow, to absorb the carbon dioxide in the rinsed gas by the basic solution to obtain a preliminary treated gas and a first weak basic solution; and
   step (C2): again contacting the preliminary treated gas with the basic solution in the way of co-current flow to absorb carbon dioxide in the preliminary treated gas by the basic solution to obtain the treated gas and a second weak basic solution, wherein the weak basic solution comprises the first weak basic solution and the second basic weak solution.

2. The method according to claim 1, wherein said step (C) is conducted at the temperature below 90° C.

3. The method according to claim 1, wherein the basic solution is sodium hydroxide solution.

4. The method according to claim 3, wherein the method comprises step (D): adding the weak basic solution to a microalgae culture tank containing microalgae.

5. The method according to claim 4, wherein the microalgae in step (D) is *Botryococcus braunii, Chlorella* sp., *Crypthecodinium cohnii, Cylindrotheca* sp., *Dunaliella primolecta, Isochrysis* sp., *Monalanthus Salina, Nannochloris* sp., *Nannochloropsis* sp., *Neochloris oleoabundans, Nitzschia* sp., *Phaeodactylum tricornutum, Schizochytrium* sp., *Tetraselmis suecica, Arthrospira maxima, Arthrospira platensis*, or any combination thereof.

6. The method according to claim 3, wherein the method comprises step (E): evaporating the moisture content in the weak basic solution to obtain a solid sodium hydrogen carbonate.

7. The method according to claim 1, wherein in step (C), the total contacting time of the basic solution with the rinsed gas is more than 5 seconds.

8. The method according to claim 1, wherein in step (C), the concentration of the basic solution is between 1 wt % and 2 wt %.

9. The method according to claim 1, wherein in step (C), the flow rate ratio of the basic solution to the rinsed gas is between 1:200 and 1:800.

* * * * *